Figure 1:
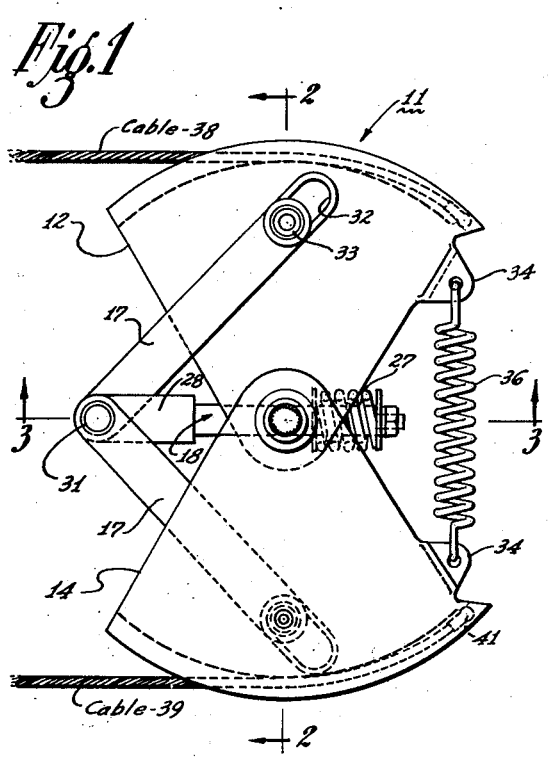

Oct. 22, 1957

J. D. PIGFORD 2,810,300

CABLE QUADRANT ASSEMBLY

Filed March 22, 1954

INVENTOR:
John D. Pigford
By Hubert E. Metcalf
His Patent Attorney

United States Patent Office 2,810,300
Patented Oct. 22, 1957

2,810,300

CABLE QUADRANT ASSEMBLY

John D. Pigford, Los Angeles, Calif., assignor to Northrop Aircraft, Inc., Hawthorne, Calif., a corporation of California Application March 22, 1954, Serial No. 417,687

3 Claims. (Cl. 74—501.5)

This invention relates to a cable quadrant assembly and more particularly to a cable quadrant assembly of the type utilized in aircraft cable systems, the assembly including features whereby it also functions as a cable tension regulator and slack compensator as well as a control quadrant.

It is generally acknowledged that some type of cable compensating device should be incorporated in all cable control systems. This is particularly true of cable systems utilized to position control surfaces and other moving parts associated with aircraft.

Cable control systems are initially rigged so that the tension present in individual cables, comprising the system, is substantially equal. If some type of cable compensating device is not provided the aforementioned tension will result in varying degrees of system wear and cable stretch. A non-uniform slack condition will generally result in the individual cables. In the case of aircraft systems additional differences in tension will occur in individual cables due to different coefficients of expansion between cables and aircraft structure, vibration and deflection of parts to which the cable system is attached, and flutter characteristics of the control surfaces operated by the system.

Any of the above conditions will inherently cause a slack or tense condition to occur in connection with all or certain individual cables of the system. Accordingly the cables may become fouled if an over slack condition prevails, or a non-uniform feel will be discernible if excessive tension prevails in any of the cables. To eliminate these conditions some type of cable compensating device is normally utilized.

Briefly the present invention assembly comprises a pair of sector shaped plates mounted for free angular movement on a driving hub. Movement of either sector plate is transmitted to the driving hub through a pair of links which are pivotally mounted on respective sector plates and a sliding member. The member passes through and slideably engages a bore in the driving hub. The majority of cable tension is maintained in the individual system cables by a helical prestressed tension spring extending between the two sector plates.

It is an object of the instant invention to provide a quadrant assembly which combines the function of a control quadrant and a cable tension regulator and slack compensator.

Another object is to provide a combined control quadrant and cable compensating device which is simple and compact in design and construction, which may be constructed in various forms best suited for a particular installation, and is economical to manufacture.

These and other objects will become more apparent from the following description and drawing in which the reference characters denote like parts throughout the several figures. It is expressly understood, however, that the drawing is for the purpose of illustration only and not a definition of the limits of the invention, reference being had for this purpose to the appended claims.

In the drawings:

Figure 1 is a detail view of the cable quadrant assembly disclosed herein.

Figure 2:
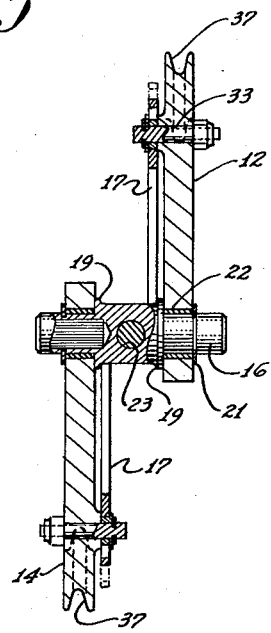
Figure 3:
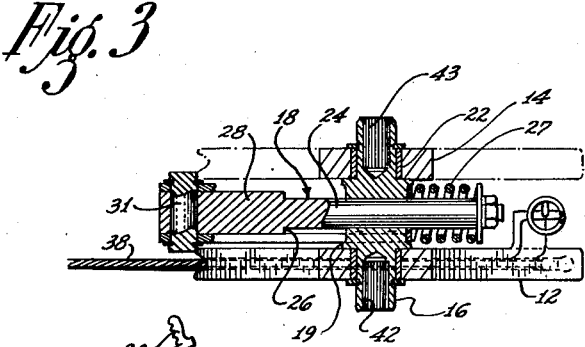

Figures 2 and 3 are sectional views of the assembly shown in Figure 1 taken on the lines 2—2 and 3—3, respectively.

Figure 4:
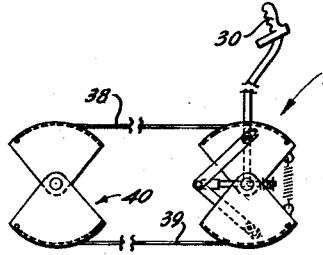

Figure 4 is a diagrammatic view of a cable control system embodying the quadrant assembly of the instant invention.

Referring now to the drawing, a preferred embodiment of a quadrant assembly 11 as disclosed herein is shown.

Major component parts of the assembly comprise a pair of sector shaped plates 12 and 14, a hub member 16, a pair of toggle links 17, and an auxiliary member 18. The plates 12 and 14 are provided with drilled holes, these holes are identically located at the apexes of the plates whereby they may be mounted on the hub 16. Annular shoulders 19 provided on the hub 16 and snap rings 21 serve to position and maintain the plates in spaced relation on the hub. The plates are free to rotate on the hub 16 and to facilitate this movement bearings 22 are provided.

One end portion 24 of the auxiliary member 18 is of cylindrical configuration and the other end 28 is rectangular in cross section. In the assembled position of the hub 16 and member 18, the end portion 24 of the latter member passes through a diametrical bore 23 provided in the hub 16 at a position midway between the shoulders 19. The end portion 24 is of such a diameter that it provides a sliding fit with the bore 23. Sliding movement of the member 18 in the bore 23 is limited by shoulders 26 and a compression spring 27, the latter surrounding the member 18 and retained in position thereon by the hub and a washer nut combination secured to the end portion 24, as best seen in Figures 1 and 3. A pin 31 is mounted in the end 28 of the member 18 so that the pin's axis is paralled to the axis of the hub 16 and its ends extend equal distances from the side faces of the end portion 28.

The sector plates 12 and 14 are retained in their assembled positions, substantially as shown in Figure 1, by the links 17. One end of each of these links is pivotally attached to the extending end portions of the pin 31 on opposite sides of the member 18. The other end of each of these links is provided with a slot 32 for accommodating pins 33 projecting from the opposing side faces of the plates 12 and 14, respectively. Each of the pins 33 are identically located with respect to the plate with which it is associated, accordingly the radial distance from the hub 16 to each pin 33 is equal and the distance between pin 31 and each of the pins 33 is normally equal. The toggle links are retained on the pins 31 and 33 by washers and snap rings or the like.

Extending from each of the sector plates 12 and 14, so that their outer ends are located between the plates, is a pair of lugs 34. A helical prestressed spring 36 is attached to and extends between these lugs. The purpose of the spring will be apparent presently. Grooves 37 are provided in the peripheral portion of each of the sector plates adapted to receive a pair of cables 38 and 39. These cables are attached to the sector plates by conventional means 41. A bore 42 is formed in each end of the hub 16 to provide means whereby the assembly 11 may be mounted to aircraft or other structure. One or both of the bores 42 may be splined as indicated at 43. These splines enable angular movement to be imparted to the hub 16 by a mating operational member.

The function of the various elements of the assembly 11 will be better understood from the following explanation of its operation.

For purposes of illustration it may be assumed that the quadrant control assembly is utilized in and constitutes a part of an aircraft cable control system, as shown in Figure 4. Accordingly it may be assumed that a splined member of a pilot's control element 30 mates with the splines 43 provided in one of the counterbores 42. As previously stated one end portion of each of the cables 38 and 39 is attached to the plates 12 and 14, respectively, their other ends may be attached to a conventional quadrant 40 or other structure to be moved.

The assembly 11 is rigged so that sector plates 12 and 14 assume a mean position at such time as the system is subject to normal operating temperatures, as shown in Figure 1. The majority of tension induced in the cables 38 and 39 is provided by the force exerted by tension spring 36 tending to rotate the plates 12 and 14. This spring is selected to provide the proper amount of tension in the cables. The synchronizing spring 27 needs only exert sufficient force to keep the toggle links 17 bottomed against the pins 33 at such time as the cable system is free from external loads.

Even though the assembly 11 is not rigged in a cable control system the plates 12 and 14 will be retained substantially as shown in Figure 1. Under non-rigged conditions the sector plates 12 and 14 may move slightly in either a clockwise or counter-clockwise direction from that shown. However, this movement is arrested at such time as the shoulders 26 contact the hub 16 or the spring 27 is sufficiently compressed to resist movement of the member 18. Although angular movement of the sector plates 12 and 14 is limited, sufficient movement is allowed so that normal changes in the length of cables 38 and 39 is absorbed.

Should different thermal expansion or deflection occur, between the cables 38 and 39 on the one hand and structure on which the assemblies 11 and 40 are mounted on the other, it is apparent the sectors 12 and 14 will be moved angularly, under the influence of the tension spring 36, to shorten or lengthen the cables as the case may be. During such adjustments the auxiliary member 18 will slide in the bore 23, this movement in one direction will be due to the excess tension occurring in the cables 38 and 39 and in the other direction due to the force exerted by the synchronizing spring 27. In either event the inner end of each slot 32 will continue to be bottomed against respective pins 33.

If torque is induced on the hub 16, due to movement of the pilot's control element 30, a binding condition will occur between the hub 16 and member 18. This binding condition effectively prevents the member 18 from sliding in the bore 23. Assume that the torque induced in the hub 16 tends to rotate it in a clockwise direction as viewed in Figure 1. The torque is transmitted to the sector plate 12 through the member 18 and the respective link 17 associated with the plate 12. Accordingly a tensile force is induced in the cable 38 which will rotate the assembly 40 in a clockwise direction.

As the tension in cable 38 increases it elongates slightly thus decreasing the tension in the no-load cable 39. As the tension in cable 39 decreases below the preload of the tension spring 36 the sector plate 14 is angularly moved in a counter-clockwise direction. This angular movement of the plate 14 is permitted by the slot 32 and also due to the fact that the plate is freely mounted on the hub 16. Accordingly any slack occurring in the cable 39 is absorbed, the cable will be maintained in its guide pulleys and the possibility of cable fouling is effectively eliminated.

From the above description it will be apparent that a control quadrant assembly is provided which effectively serves as a control quadrant, a cable tension regulator and a cable slack compensator.

While in order to comply with the statutes the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A cable quadrant assembly, comprising: a generally cylindrical hub; a pair of sector shaped plates mounted for angular movement on said hub and having a normal position in which their peripherical portions are positioned diametrically opposite from each other with respect to said hub; an elongated member mounted on said hub for limited bi-directional sliding movement in a direction normal to the axis of said hub; first and second link members; one end of each link being pivotally attached to one end of said elongated member; the other end of said first link being connected to one of said plates and the other end of said second link being connected to the other one of said plates by pivotal attachments; said pivotal attachments of said links with said plates comprising a slot in each of said links and a cylindrical pin on each of said plates; first elastic means associated with said elongated member and being mounted to exert a force thereon continuously urging said one end of said elongated member toward said hub; the angular movement of said plates from their said normal position being limited by said links and elongated member; second elastic means located on the side of said hub opposite said one end of said elongated member and extending between said plates tending to move the latter in opposite angular directions; and a cable receiving groove in the peripheral portion of each of said plates.

2. A cable quadrant assembly, comprising: a generally cylindrical hub; a pair of plates mounted for angular movements on said hub; attaching means projecting from a side face of each plate; said plates having a normal position in which their respective attaching means are diametrically opposite from each other with respect to said hub; an elongated member mounted on said hub for limited bi-directional sliding movement in a direction normal to the axis of said hub; first and second link members; one end of each link being pivotally attached to one end of said elongated member; the other end of said first link being connected to the attaching means projecting from one of said plates, and the other end of said second link being connected to the attaching means projecting from the other one of said plates, by elongated apertures formed in said links which extend lengthwise thereof; the angular movement of said plates from their normal position being limited by said links and elongated member; first elastic means associated with said elongated member and being mounted to exert a force thereon continuously urging said one end of said elongated member toward said hub; second elastic means located on the side of said hub opposite said one end of said elongated member and extending between said plates tending to move them in opposite angular directions; and a cable receiving groove in each of said plates.

3. A cable control system, comprising: a first quadrant assembly including; a generally cylindrical hub; a pair of sector shaped plates mounted for angular movement on said hub and having a normal position in which their peripheral portions are positioned diametrically opposite from each other with respect to said hub: an elongated member mounted on said hub for limited bi-directional sliding movement in a direction normal to the axis of said hub; first and second link members; one end of each link being pivotally attached to one end of said elongated member, the other end of said first link being connected to one of said plates and the other end of said second link being connected to the other one of said plates by pivotal attachments; said pivotal attachments of said links with said plates comprising a slot in each of said links and a cylindrical pin on each of said plates; first elastic means associated with said elongated member and being mounted to exert a force thereon continuously urging said one end of said elongated member toward said hub; the angular movement of said plates from their said normal position being limited by said links and elongated member; a second quadrant assembly spaced from said first assembly and having a pair of sector plates; a pair of cables attached to and extending between respective sector plates of said first and second assemblies so that angular movement of said first assembly is transmitted to said second assembly; second elastic means located on the side of said hub opposite said one end of said elongated member and extending between the sector plates of said first assembly adapted to effect and maintain a predetermined stress in each of said cables; and an operating member attached to said hub whereby torque may be transmitted thereto.

References Cited in the file of this patent
UNITED STATES PATENTS

| | | |
|---|---|---|
| 2,363,228 | Cade | Nov. 21, 1944 |
| 2,581,080 | Cushman | Jan. 1, 1952 |
| 2,585,358 | Weber | Feb. 12, 1952 |